US012607342B1

(12) United States Patent
Zhu

(10) Patent No.: US 12,607,342 B1
(45) Date of Patent: Apr. 21, 2026

(54) EAVE LAMP

(71) Applicant: Kexin Zhu, Zhejiang (CN)

(72) Inventor: Kexin Zhu, Zhejiang (CN)

( * ) Notice: Subject to any disclaimer, the term of this patent is extended or adjusted under 35 U.S.C. 154(b) by 0 days.

(21) Appl. No.: 19/262,070

(22) Filed: Jul. 7, 2025

(51) Int. Cl.

| | |
|---|---|
| ***F21V 31/00*** | (2006.01) |
| ***F21S 8/04*** | (2006.01) |
| ***F21V 15/01*** | (2006.01) |
| ***F21V 23/00*** | (2015.01) |
| ***F21W 131/107*** | (2006.01) |

(52) U.S. Cl.
CPC .............. *F21V 31/005* (2013.01); *F21S 8/04* (2013.01); *F21V 15/01* (2013.01); *F21V 23/002* (2013.01); *F21W 2131/107* (2013.01)

(58) Field of Classification Search
CPC ...... F21V 31/005; F21V 15/01; F21V 23/002; F21S 8/04; F21S 4/10; F21S 4/00; F21W 2131/107
See application file for complete search history.

(56) References Cited

U.S. PATENT DOCUMENTS 12,276,416 B1 * 4/2025 Hu ........................ F21V 31/005
12,392,484 B1 * 8/2025 Tang ....................... F21V 15/01
2004/0196636 A1 * 10/2004 Kim .......................... F21S 4/10 361/736
2011/0194292 A1 * 8/2011 Tsai .......................... F21S 4/10 362/231
2025/0198602 A1 * 6/2025 Guo .......................... F21S 4/10

FOREIGN PATENT DOCUMENTS

CN 201407607 Y * 2/2010
EP 2284438 A1 * 2/2011 ............ F21V 21/002
WO WO-2015117293 A1 * 8/2015 ............ F21V 31/005

* cited by examiner

*Primary Examiner* — Erin Kryukova

(74) *Attorney, Agent, or Firm* — Hawaii Patent Services; Nathaniel K. Fedde; Kenton N. Fedde

(57) ABSTRACT

The present disclosure provides an eave lamp, comprising a shell and a lighting assembly. The shell comprises an upper cover and a lower cover that are interconnected; the lighting assembly comprises a lamp panel and a lens, which are sequentially installed between the upper cover and the lower cover. A lens sealing ring is arranged between the upper cover and the lens. Wires are connected to both ends of the lamp panel and electrically connected to the lamp panel. Fixing grooves are provided on both sides of the shell, and a wire sealing ring is arranged between the shell and the wires.

17 Claims, 6 Drawing Sheets

EAVE LAMP

TECHNICAL FIELD

The present disclosure relates to the technical field of lighting equipment, particularly to an eave lamp.

BACKGROUND

As a type of LED point light source, eave lamps are widely used in urban lighting projects, building facade contouring, commercial space lighting decoration, and other scenarios, often installed along the edges of structures such as commercial buildings, hotels, bars, and entertainment venues.

However, existing eave lamps generally suffer from poor waterproofing, weak dust resistance, limited adaptability, short service life, and cumbersome installation and maintenance. Particularly in dusty and humid environments, they are prone to malfunctions, increasing post-maintenance costs and affecting overall performance.

Therefore, there is a need to propose a new type of eave lamp to address the aforementioned issues.

SUMMARY

The present disclosure provides an eave lamp to solve the problems raised in the background art.

To achieve the above object of the invention, the following technical solution is adopted:

The present disclosure provides an eave lamp, comprising a shell and a lighting assembly. The shell comprises an upper cover and a lower cover. The lighting assembly comprises a lamp panel and a lens, which are sequentially installed between the upper cover and the lower cover, with a lens sealing ring arranged between the upper cover and the lens. Wires are connected to both ends of the lamp panel and electrically connected to the lamp panel, fixing grooves are provided on both sides of the shell, and the wires extend through the fixing grooves to the outside of the shell, with a wire sealing ring arranged between the shell and the wires. The upper cover and the lower cover are sealed together by ultrasonic welding to form the shell.

The present disclosure further provides an eave lamp, comprising a shell and a lighting assembly. The shell comprises an upper cover and a lower cover. The lighting assembly comprises a lamp panel and a lens, which are sequentially installed between the upper cover and the lower cover, with a lens sealing ring arranged between the upper cover and the lens. Wires are arranged at both ends of the lamp panel and electrically connected to the lamp panel, fixing grooves are provided on both sides of the shell, and the wires extend through the fixing grooves to the outside of the shell, with a wire sealing ring arranged between the shell and the wires.

BRIEF DESCRIPTION OF DRAWINGS

The drawings, which constitute part of this application, are included to provide further understanding of the present disclosure. The illustrative embodiments and the descriptions thereof are intended to explain the present disclosure and do not constitute undue limitations. In the drawings.

Figure 1:
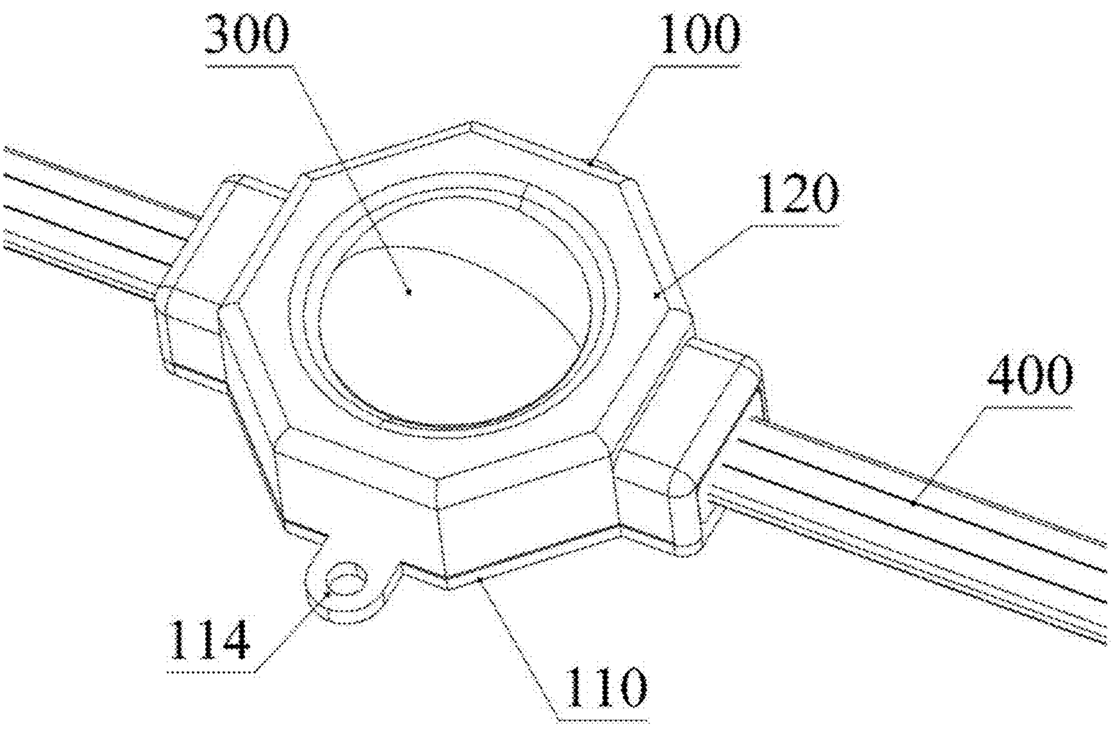
FIG. 1 is a schematic structural diagram of the present disclosure.

Reference signs: Shell (100); Lower cover (110); First fixing groove (111); First mounting ring (112); Second mounting ring (113); Mounting part (114); Upper cover (120); Second fixing groove (121); Abutment ring (122); Fixing groove (130); Second mounting groove (131); Lamp panel (200); Lens (300); Lens sealing ring (310); Third mounting groove (320); Wire (400); Retaining clip (410); First mounting groove (420); Wire sealing ring (430).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

As shown in FIGS. 1 to 8, an eave lamp includes a shell 100 and a lighting assembly. The shell 100 consists of an upper cover 120 and a lower cover 110 connected to each other. The lighting assembly includes a lamp panel 200 and a lens 300, which are sequentially installed between the upper cover 120 and the lower cover 110. A lens sealing ring 310 is placed between the upper cover 120 and the lens 300 to prevent rainwater or dust from entering the interior of the shell 100 through the lens 300. Wires 400 are arranged at both ends of the lamp panel 200 and electrically connected to the lamp panel 200, with wire sealing rings 430 fitted on the wires 400. Fixing grooves 130 are provided on both sides of the shell 100, and the wires 400 extend through these grooves to the exterior of the shell 100. Wire sealing rings 430 are also installed between the shell 100 and the wires 400 to ensure sealing between them, further enhancing protection performance. The upper cover 120 and lower cover 110 are sealed together using an ultrasonic welding process to form the shell 100, with the ultrasonic sealing interface created along the mating periphery of the upper cover 120 and the lower cover 110. Continuous sealing is achieved through ultrasonic welding, and to improve welding strength and sealing reliability, a double ultrasonic welding process is employed, effectively boosting the shell 100's overall waterproof and dustproof capabilities, thereby extending the lamp's service life. Ultrasonic welding offers advantages such as fast welding speed, neat weld points, and strong sealing, making it particularly suitable for batch automated assembly of plastic shell 100 structures.

In other embodiments (not shown), the upper cover 120 and lower cover 110 may also be sealed and connected using methods such as rubber sealing strips pressed tightly, adhesive sealing, or snap-fit mechanical locking combined with elastic sealing rings. Different sealing connection methods can be adopted based on varying application environments.

Figure 2:
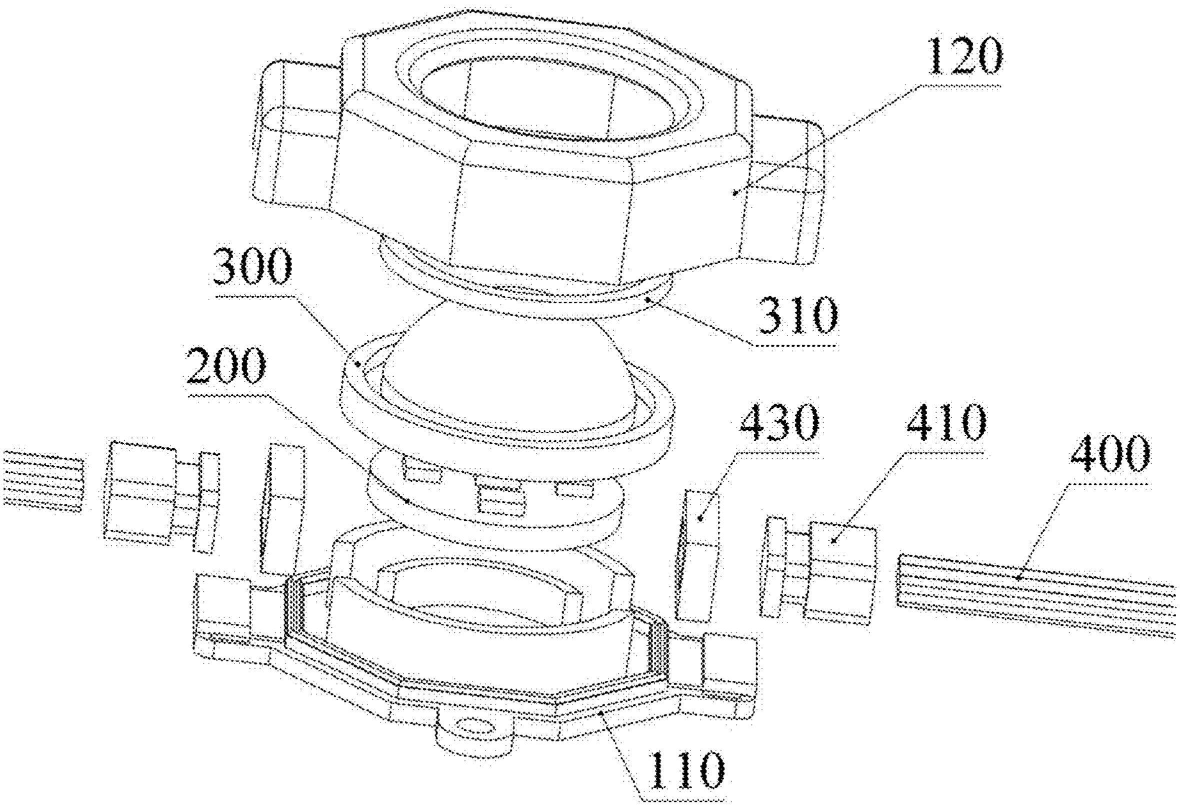
FIG. 2 is an exploded schematic diagram of the present disclosure.
Figure 3:
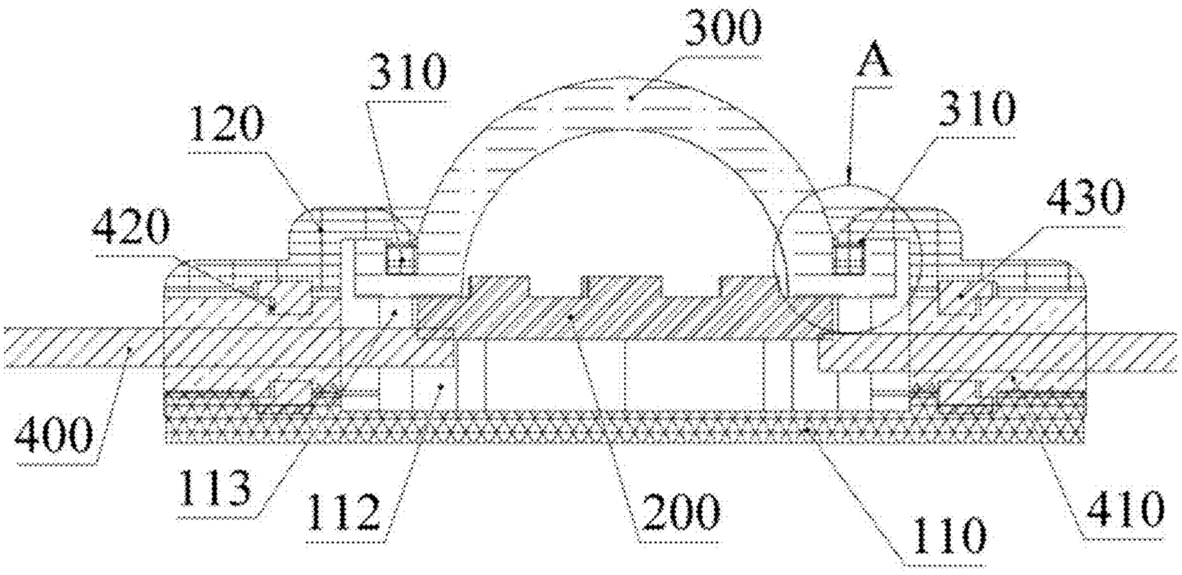
FIG. 3 is a cross-sectional view of the present disclosure.
Figure 4:
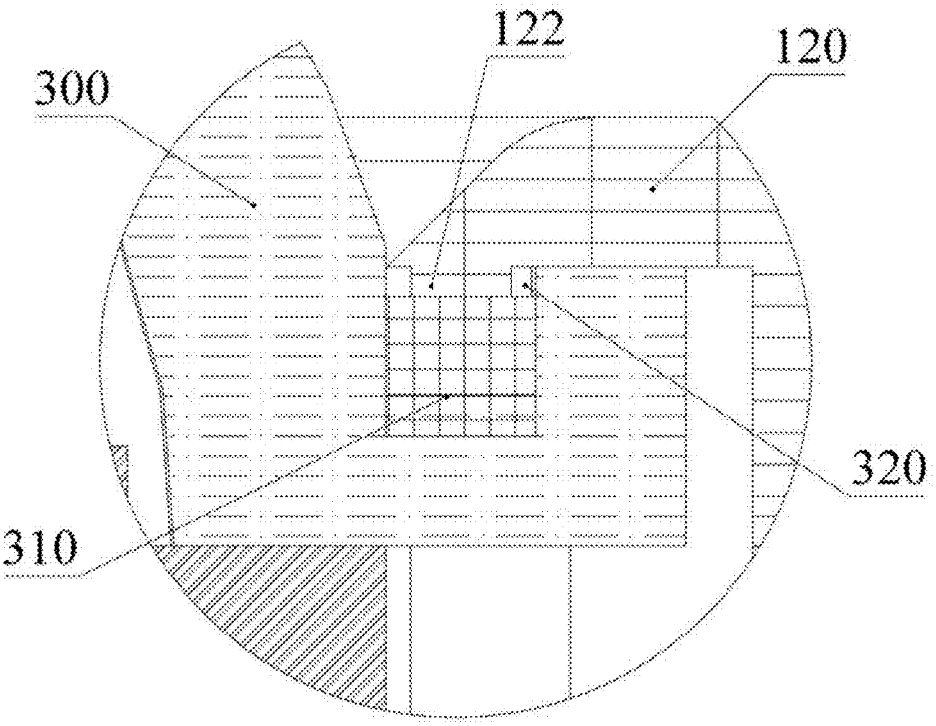
FIG. 4 is an enlarged view of section A in FIG. 3.
Figure 5:
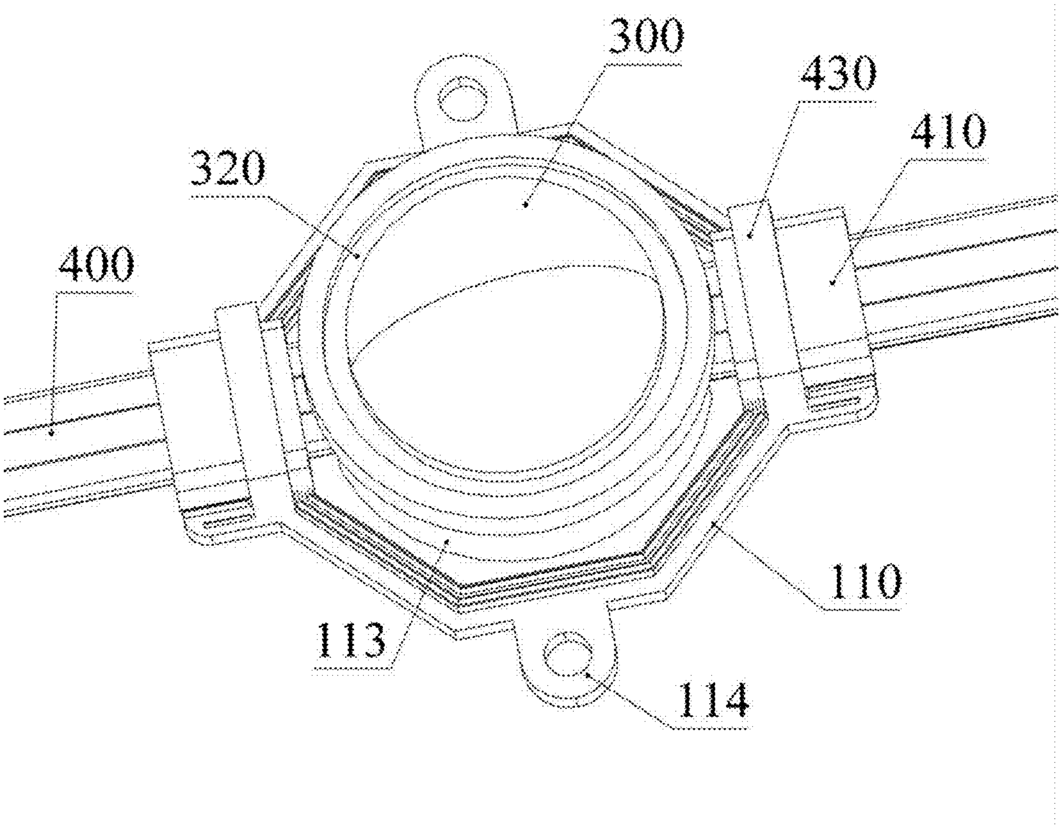
FIG. 5 is a schematic structural diagram of the interior of the shell of the present disclosure.

As shown in FIGS. 2, 3, and 4, the wire 400 is additionally equipped with a retaining clip 410, which is installed in the fixing groove 130 to securely position the wire 400, preventing the wire 400 from loosening or detaching due to external forces such as pulling or shaking during use. This enhances the overall reliability and anti-interference capability of the lamp structure. The retaining clip 410 is an integrally injection-molded structure made of nylon or other high-temperature-resistant, aging-resistant insulating materials. The retaining clip 410 is provided with a first mounting groove 420, where a wire sealing ring 430 is installed. For optimal sealing, the wire sealing ring 430 is slightly larger in size than the first mounting groove 420, allowing it to exhibit some compression deformation after assembly, so that the wire sealing ring 430 remains partially exposed after installation, that is, the wire sealing ring 430 protrudes at least partially from the first mounting groove 420. This ensures an effective sealing transition between the retaining clip 410 and the fixing groove 130, thereby improving the overall sealing performance at the wire 400 exit. It effectively prevents moisture, dust, and other foreign substances from entering the shell 100 through the wire channel, enhancing the lamp's protection rating and extending its service life in outdoor environments.

As shown in FIGS. 3, 5, 6, and 7, the fixing groove 130 includes a first fixing groove 111 on the lower cover 110 and a second fixing groove 121 on the upper cover 120. The first fixing groove 111 and the second fixing groove 121 correspond to each other. When the upper cover 120 is connected to the lower cover 110, they jointly form a complete fixing groove 130 to accommodate the wire 400, along with its retaining clip 410 and wire sealing ring 430 arranged thereon, creating a clamping-type positioning structure. This structure not only improves the fixing strength of the wire 400, preventing it from loosening under external forces, but also further enhances the sealing effect at the wire 400 exit. The first fixing groove 111 supports and restricts the bottom structure of the retaining clip 410, while the second fixing groove 121 presses down on the retaining clip 410 when the cover is closed, compressing the wire sealing ring 430 between the two grooves to form an effective sealed state. The structure of the combined upper and lower fixing groove 130 helps the eave lamp maintain excellent waterproof and dustproof performance in outdoor use.

In other embodiments (not shown), the wire 400 and the lamp panel 200 can be electrically connected using male and female plug connectors instead of traditional soldering or direct crimping methods, further enhancing the assembly convenience and maintenance efficiency of the eave lamp. Specifically, electrical sockets can be installed at both ends of the lamp panel 200, with corresponding plugs attached to the ends of the wire 400. The plugs and sockets use standard waterproof connectors (such as waterproof DC plugs, two-core or three-core waterproof connectors), ensuring stable and reliable electrical connections with excellent waterproof and anti-loosening effects after insertion.

As shown in FIGS. 3, 5, 6, and 7, the fixing groove 130 also includes a second mounting groove 131, which is formed on the inner wall of the fixing groove 130 to accommodate the exposed part of the wire sealing ring 430. The exposed part of the wire sealing ring 430 is installed in the second mounting groove 131, and the exposed part of the wire sealing ring is further compressed by second mounting groove 131. When the upper cover 120 and the lower cover 110 are pressed together, a complete sealed crimping state is formed, effectively preventing rainwater, dust, and other foreign substances from entering the shell 100 through gaps along the wire 400, thereby improving sealing integrity and structural stability.

Figure 6:
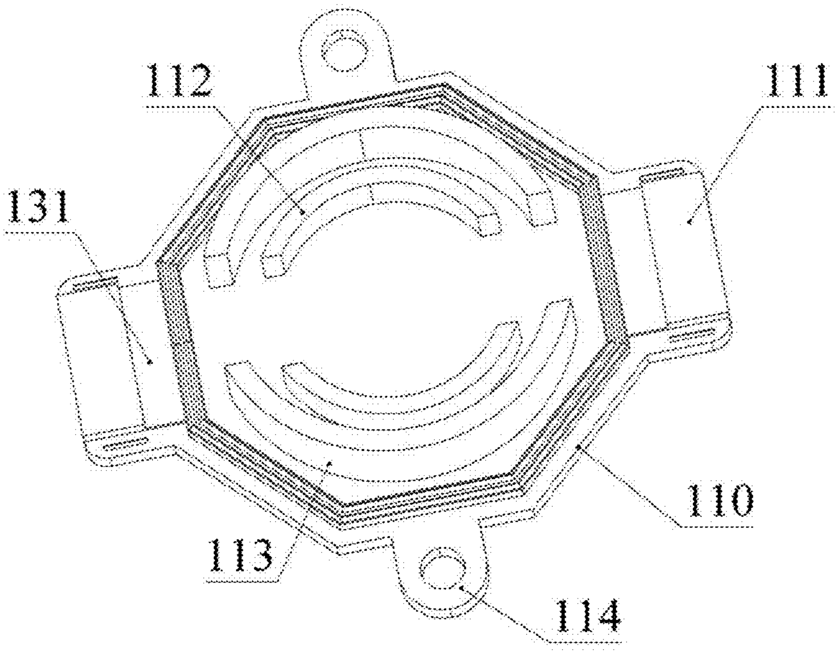
FIG. 6 is a schematic structural diagram of the lower cover of the present disclosure.

As shown in FIGS. 2, 3, and 6, the lower cover 110 is equipped with a first mounting ring 112 and a second mounting ring 113. The first mounting ring 112, with its annular structure, is located in the central area of the lower cover 110. The lamp panel 200 is mounted on the first mounting ring 112, which serves to position and support the lamp panel 200, ensuring stable and horizontal installation of the lamp panel 200 on the lower cover 110. The lens 300 is mounted on the second mounting ring 113. The e second mounting ring 113 is positioned concentrically outside the first mounting ring 112 (i.e., their center points coincide), aligning the lamp panel 200 and the lens 300 along the optical axis. This facilitates light diffusion through the lens 300, improving illumination efficiency and uniformity. Furthermore, the second mounting ring 113 is taller than the first mounting ring 112, creating a raised step structure. When the lamp panel 200 is installed on the first mounting ring 112, the upper surface of the lamp panel 200 is aligned with the upper surface of the second mounting ring 113. When the lens 300 is installed on the second mounting ring 113, at least part of it is directly abutted against the upper surface of the lamp panel 200, providing a clamping function to restrict movement of the lamp panel 200.

Referring to FIGS. 2, 3, and 4, in this embodiment, to achieve effective sealing between the lens 300 and the upper cover 120, the lens 300 is provided with a third mounting groove 320. The third mounting groove 320 is an annular recess arranged along the outer peripheral edge of the lens 300, with structural dimensions matching those of the sealing ring. The lens sealing ring 310 is installed within the third mounting groove 320 and is preferably made of materials with good elasticity and weather resistance, such as silicone or rubber. Correspondingly, the inner side of the upper cover 120 features a raised abutment ring 122 at a position corresponding to the third mounting groove 320 of the lens 300. When the abutment ring 122 is abutted against the lens sealing ring 310, the abutment ring 122 compresses the sealing ring, causing it to deform under pressure and forming an elastic seal that tightly adheres between the upper cover 120 and the lens 300. This effectively prevents rainwater, dust, etc., from infiltrating the shell 100 through gaps between the upper cover 120 and the lens 300, enhancing the lamp's waterproof and dustproof performance. Additionally, the elasticity of the lens sealing ring 310 can buffer contact loosening caused by thermal expansion, contraction, or minor vibrations, improving the long-term sealing stability and environmental adaptability of the structure, thereby increasing the durability and reliability of the eave lamp.

Referring to FIG. 1, in this embodiment, the lower cover 110 is also equipped with a mounting part 114 for installation and fixation. The mounting part 114 is integrally formed with the lower cover 110 and features at least one through-hole. The size and shape of the through-hole are compatible with standard mounting screws (such as self-tapping screws or expansion bolts), allowing users to securely fasten the eave lamp to building eaves, walls, or other supporting structures using screws, preventing loosening or detachment due to external vibrations.

In other embodiments (not shown), magnets may be installed on the lower cover 110, enabling the eave lamp to be directly attached to ferromagnetic metal surfaces (such as metal gutters, steel beams, or structural components) via magnetic force. This eliminates the need for drilling or screw installation, simplifying the setup process and making it suitable for temporary lighting or movable scenarios where structural damage is undesirable.

In another embodiment (not shown), a cushion pad may also be provided on the lower cover 110 to buffer direct contact between the lamp body and the installation surface, preventing scratches, deformation, or noise caused by hard contact, thereby protecting the surface of the installation structure. This is suitable for decorative or fragile architectural eaves or metal components. The cushion pad can also automatically compensate for gaps, improving the fit degree.

Figure 7:
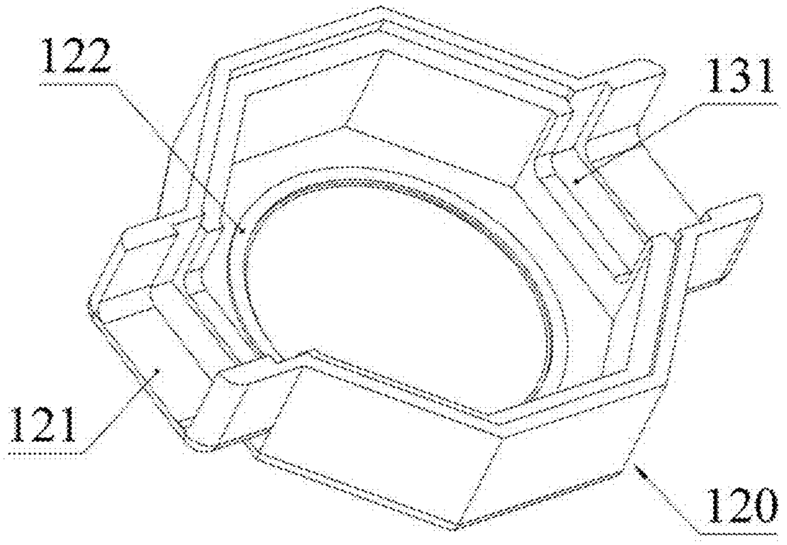
FIG. 7 is a schematic structural diagram of the upper cover of the present disclosure.
Figure 8:
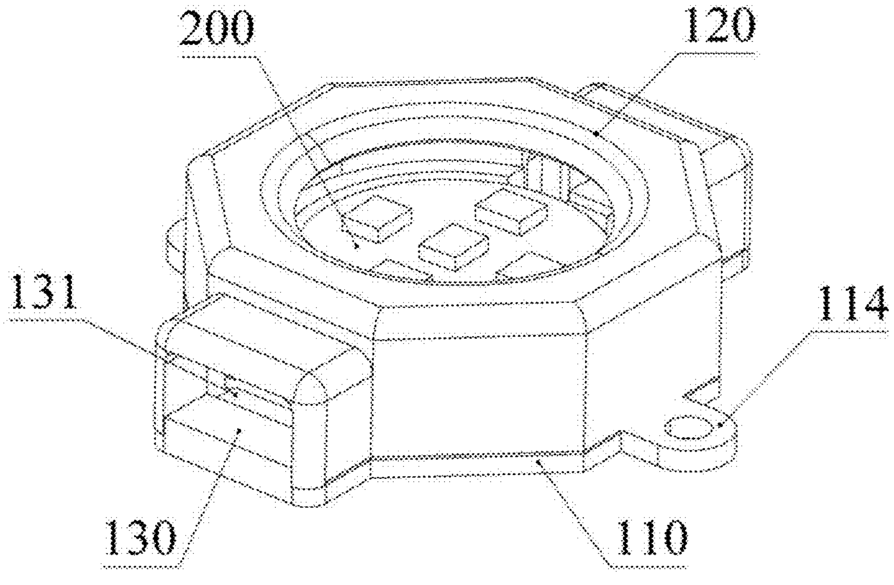
FIG. 8 is a schematic structural diagram of the fixing groove of the present disclosure.

Referring to FIGS. 2, 3, and 7, in this embodiment, the upper cover 120 is provided with an opening to allow the lens 300 to at least partially pass through the opening and contact the external environment. The lens 300 adopts a convex lens structure with an outwardly curved spherical or aspherical design, effectively focusing or diffusing light emitted by the lamp panel 200 to achieve the desired lighting effect. The lens 300 is made of high-transparency material, preferably engineering plastics such as transparent polycarbonate (PC) or acrylic resin (PMMA). These materials offer excellent optical transmittance, typically exceeding 90%, ensuring minimal light loss in the lens 300 and thereby effectively improving lighting efficiency. The high-transparency material not only ensures uniform light transmission and good refraction but also features excellent weather resistance and UV resistance, maintaining transparency without yellowing or cracking in long-term outdoor environments. After the lens 300 partially protrudes through the opening of the upper cover 120, its convex portion directly faces the illumination area, enhancing light transmission efficiency and uniformity while reducing obstruction and reflection loss caused by the upper cover 120. This also facilitates cleaning and maintenance of the lens 300 surface, helping to maintain optimal lighting performance and extend the fixture's service life.

In other embodiments (not shown in the figure), the lens 300 can be designed as an aspherical convex lens to optimize beam focusing and improve lighting uniformity. Alternatively, a micro-prism structure or diffusive textured surface design may be adopted to achieve softer and more uniform lighting effects, catering to different architectural or landscape lighting needs.

In other embodiments (not shown), the surface of the lens 300 is treated with a multilayer anti-reflection (AR) coating technology to further enhance optical performance. This coating is typically composed of multiple layers of inorganic thin-film materials with different refractive indices (e.g., silicon oxide, magnesium fluoride, titanium dioxide) alternately deposited, which effectively reduces the reflectivity of the lens 300 surface, allowing more light to pass through the lens 300 and significantly improving its transmittance and illumination efficiency. The coating also provides certain anti-fouling and anti-scratch functions, enhancing the lens 300 surface's resistance to dust, oil, and mechanical wear, thereby reducing maintenance frequency and extending service life.

In summary, as can be seen from the above description, the present disclosure achieves the following technical effects:

Through the dual ultrasonic welding process of the upper cover 120 and the lower cover 110, a continuous, gap-free sealing edge is formed, along with the multi-stage compression sealing structure of the lens sealing ring 310 and the wire sealing ring 430, effectively preventing rainwater and dust from entering the interior of the shell 100, making it suitable for harsh outdoor environments such as dusty and humid conditions. The lens sealing ring 310 is placed between the lens 300 and the upper cover 120 to prevent water and dust from seeping through the gap between the lens 300 and the upper cover 120, while the wire sealing ring 430 is placed between the wire 400 and the fixing groove 130 to prevent water and dust from seeping through the gap between the he wire 400 and the fixing groove 130. The multilayer sealing design ensures the eave lamp operates stably for long periods in harsh outdoor environments like dust and humidity, extending service life and reducing failure rates and maintenance costs.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. An eave lamp, comprising:

a shell and a lighting assembly, wherein the shell comprises an upper cover and a lower cover;

the lighting assembly comprises a lamp panel and a lens, which are sequentially installed between the upper cover and the lower cover, with a lens sealing ring arranged between the upper cover and the lens;

wires are connected to both ends of the lamp panel and electrically connected to the lamp panel, fixing grooves are provided on both sides of the shell, and the wires extend through the fixing grooves to an outside of the shell, with a respective wire sealing ring arranged between the shell and each of the wires, wherein each of the wires is provided with a respective retaining clip, the retaining clips are installed in the fixing grooves, the respective retaining clip is provided with a first mounting groove, and the respective wire sealing ring is installed in the first mounting groove and has at least part thereof exposed outside the first mounting groove; and the upper cover and the lower cover are sealed together by ultrasonic welding to form the shell.

2. The eave lamp according to claim 1, wherein each of the fixing grooves are defined by a first fixing groove on the lower cover and a second fixing groove on the upper cover.

3. The eave lamp according to claim 1, wherein each of the fixing grooves is further provided with a second mounting groove, and the at least part of the respective wire sealing ring exposed outside the first mounting groove is installed in the second mounting groove.

4. The eave lamp according to claim 1, wherein the lower cover is provided with a first mounting ring and a second mounting ring, which are concentrically arranged; and the lamp panel is installed on the first mounting ring, the second mounting ring is arranged outside the first mounting ring, and the lens is installed on the second mounting ring.

5. The eave lamp according to claim 1, wherein the lens is provided with a third mounting groove, and the lens sealing ring is installed in the third mounting groove.

6. The eave lamp according to claim 5, wherein the upper cover is provided with an abutment ring at a position corresponding to the third mounting groove, and the abutment ring abuts against the lens sealing ring.

7. The eave lamp according to claim 1, wherein the upper cover is provided with an opening, and at least part of the lens passes through the opening to contact an external environment.

8. The eave lamp according to claim 1, wherein the lower cover is further provided with a mounting part for installation and fixation.

9. An eave lamp, comprising:

a shell and a lighting assembly, wherein the shell comprises an upper cover and a lower cover;

the lighting assembly comprises a lamp panel and a lens, which are sequentially installed between the upper cover and the lower cover, with a lens sealing ring arranged between the upper cover and the lens; and wires are arranged at both ends of the lamp panel and electrically connected to the lamp panel, fixing grooves are provided on both sides of the shell, and the wires extend through the fixing grooves to an outside of the shell, with a respective wire sealing ring arranged between the shell and each of the wires, wherein each of the wires is provided with a respective retaining clip, the retaining clips are installed in the fixing grooves, the respective retaining clip is provided with a first mounting groove, the respective wire sealing ring is installed in the first mounting groove and has at least part thereof exposed outside the first mounting groove.

10. The eave lamp according to claim 9, wherein the upper cover and the lower cover are sealed by ultrasonic welding to form the shell.

11. The eave lamp according to claim 9, wherein each of the fixing grooves is defined by a first fixing groove provided on the lower cover and a second fixing groove provided on the upper cover.

12. The eave lamp according to claim 9, wherein a second mounting groove is further provided in each of the fixing grooves, and the at least part of the respective wire sealing ring exposed outside the first mounting groove is installed in the second mounting groove.

13. The eave lamp according to claim 9, wherein the lower cover is provided with a first mounting ring and a second mounting ring, which are concentrically arranged; and the lamp panel is installed on the first mounting ring, the second mounting ring is arranged outside the first mounting ring, and the lens is installed on the second mounting ring.

14. The eave lamp according to claim 9, wherein the lens is provided with a third mounting groove, and the lens sealing ring is installed in the third mounting groove.

15. The eave lamp according to claim 14, wherein the upper cover is provided with an abutment ring at a position corresponding to the third mounting groove, and the abutment ring abuts against the lens sealing ring.

16. The eave lamp according to claim 9, wherein the upper cover is provided with an opening, and the lens at least partially passes through the opening to contact an external environment.

17. The eave lamp according to claim 9, wherein the lower cover is further provided with a mounting part for installation and fixation.

* * * * *